(12) United States Patent
Mirkin et al.

(10) Patent No.: US 7,824,467 B2
(45) Date of Patent: Nov. 2, 2010

(54) METHOD OF MAKING METAL NANOPRISMS HAVING A PREDETERMINED THICKNESS

(75) Inventors: Chad A. Mirkin, Wilmette, IL (US); Gabriella Metraux, Evanston, IL (US)

(73) Assignee: Northwestern University, Evanston, IL (US)

( * ) Notice: Subject to any disclaimer, the term of this patent is extended or adjusted under 35 U.S.C. 154(b) by 739 days.

(21) Appl. No.: 11/629,830

(22) PCT Filed: Jun. 29, 2005

(86) PCT No.: PCT/US2005/023038

§ 371 (c)(1),
(2), (4) Date: Aug. 24, 2007

(87) PCT Pub. No.: WO2006/132643

PCT Pub. Date: Dec. 14, 2006

(65) Prior Publication Data

US 2008/0295646 A1 Dec. 4, 2008

Related U.S. Application Data

(60) Provisional application No. 60/584,775, filed on Jun. 30, 2004.

(51) Int. Cl.
B22F 9/24 (2006.01)

(52) U.S. Cl. .................................................... 75/371

(58) Field of Classification Search .................. None
See application file for complete search history.

(56) References Cited

U.S. PATENT DOCUMENTS

2003/0136223 A1* 7/2003 Jin et al. .................. 75/345

OTHER PUBLICATIONS

Ahmadi et al., "Shape-Controlled Synthesis of Colloidal Platinum Nanoparticles", *Science*, 272:1924-1926 (1996).
Bradley et al., "Surface Spectroscopic Study of the Stabilization Mechanism for Shape-Selectively Synthesized Nanostructured Transition Metal Colloids", *J. Am. Chem. Soc.*, 122:4631-4636 (2000).
Callegari et al., "Photochemically Grown Silver Nanoparticles with Wavelength-Controlled Size and Shape", *Nano Lett.*, 3:1565-1568, (2003).
Caswell et al., "Seedless, Surfactantless Wet Chemical Synthesis of Silver Nanowires", *Nano Lett.*, 3:667-669 (2003).
Chen et al., "Silver Nanodisks: Synthesis, Characterization, and Self-Assembly", *J. Phys. Chem. B*, 106:10777-10781 (2002).
Chen et al., "Synthesis and Characterization of Truncated Triangular Silver Nanoplates", *Nano Lett.*, 2:1003-1007 (2002).
Esumi et al., "Preparation of Rodlike Gold Particles by UV Irradiation Using Cationic Micelles as a Template", *Langmuir*, 11:3285-3287 (1995).

(Continued)

*Primary Examiner*—Roy King
*Assistant Examiner*—Yoshitoshi Takeuchi
(74) *Attorney, Agent, or Firm*—Marshall, Gerstein & Borun LLP (57) ABSTRACT

A method of preparing metal nanoprisms having a unimodal size distribution and a predetermined thickness. The present method also allows control over nanoprism edge length.

23 Claims, 8 Drawing Sheets

OTHER PUBLICATIONS

Gao et al., "Dependence of the Gold Nanorod Aspect Ratio on the Nature of the Directing Surfactant in Aqueous Solution", *Langmuir*, 19:9065-9070 (2003).

Hao et al., "Synthesis of Silver Nanodisks Using Polystyrene Mesospheres as Templates", *J. Am. Chem. Soc.*, 124:15182-15183 (2002).

Hao et al., "Synthesis and Optical Properties of 'Branched' Gold Nanocrystals", *Nano Lett.*, 4:327-330 (2003).

Jackson et al., "Silver Nanoshells: Variations in Morphologies and Optical Properties", *J. Phys. Chem. B*, 105:2743-2746 (2001).

Jana et al., "Wet Chemical Synthesis of High Aspect Ratio Cylindrical Gold Nanorods", *J. Phys. Chem. B*, 105:4065-4067 (2001).

Jin et al., "Photoinduced Conversion of Silver Nanospheres to Nanoprisms", *Science*, 294:1901-1903 (2001).

Jin et al., "Controlling anisotropic nanoparticle growth through plasmon excitation", *Nature*, 425:487-490 (2003).

Jin et al., "One-Pot Synthesis and Characterization of Novel Silver—Gold Bimetallic Nanostructures with Hollow Interiors and Bearing Nanospikes", *J. Phys. Chem. B*, 107:12902-12905 (2003).

Kelly et al., "The Optical Properties of Metal Nanoparticles: The Influence of Size, Shape, and Dielectric Environment", *J. Phys. Chem. B*, 107:668-677 (2003).

Kim et al., "Photochemical Synthesis of Gold Nanorods", *J. Am. Chem. Soc.*, 124:14316-14317 (2002).

Klaus et al., "Silver-based crystalline nanoparticles, microbially fabricated", *Proc. Natl. Acad. Sci. U.S.A.*, 96:13611-13614 (1999).

Li et al., "Coupled synthesis and, self-assembly of nanoparticles to give structures with controlled organization", *Nature*, 402:393-395 (1999).

Maillard et al., "Silver Nanodisks", *Adv. Mater.*, 14:1084-1086 (2002).

Maillard et al., "Silver Nanodisk Growth by Surface Plasmon Enhanced Photoreduction of Adsorbed [$Ag^+$]", *Nano Lett.*, 3:1611-1615 (2003).

Manna et al., "Synthesis of Soluble and Processable Rod-, Arrow-, Teardrop-, and Tetrapod-Shaped CdSe Nanocrystals", *J. Am. Chem. Soc.*, 122:12700-12706 (2000).

Metraux et al., "Triangular Nanoframes Made of Gold and Silver", *Nano Lett.*, 3:519-522 (2003).

Oldenburg et al., "Infrared extinction properties of gold nanoshells", *Applied Physics Letters*, 75:2897-99 (1999).

Peng et al., "Shape control of CdSe nanocrystals", *Nature*, 404:59-61 (2000).

Pinna et al., "Triangular CdS Nanocrystals: Structural and Optical Studies", *Ad. Mater.*, 13:261-264 (2001).

Puntes et al., "Colloidal Nanocrystal Shape and Size Control: The Case of Cobalt", *Science*, 291:2115-2117 (2001).

Sun et al., "Crystalline Silver Nanowires by Soft Solution Processing", *Nano Lett.*, 2:165-168 (2002).

Sun et al., "Metal Nanostructures with Hollow Interiors", *Adv. Mater.*, 15:641-646 (2003).

Sun et al., "Polyol Synthesis of Uniform Silver Nanowires: A Plausible Growth Mechanism and the Supporting Evidence", *Nano Lett.*, 3:955-960 (2003).

Sun et al., "Transformation of Silver Nanospheres into Nanobelts and Triangular Nanoplates through a Thermal Process", *Nano Lett.*, 3:675-679 (2003).

Sun et al., "Gold and silver nanoparticles: A class of chromophores with colors tunable in the range from 400 to 750 nm", *Analyst*, 128:686-691 (2003).

Sun et al., "Triangular Nanoplates of Silver: Synthesis, Characterization, and Use as Sacrificial Templates for Generating Triangular Nanorings of Gold", *Adv. Mater.*, 15:695-699 (2003).

Tan et al., "Preparation of silver nanocrystals in the presence of aniline", *J. Coll. Int. Sci.*, 258:244-251 (2003).

Tian et al., "Electrochemical Growth of Single-Crystal Metal Nanowires via a Two-Dimensional Nucleation and Growth Mechanism", *Nano Lett.*, 3:919-923 (2003).

Walter et al., "Noble and Coinage Metal Nanowires by Electrochemical Step Edge Decoration", *J. Phys. Chem. B*, 106:11407-11411 (2002).

Yu et al., "Gold Nanorods: Electrochemical Synthesis and Optical Properties", *J. Phys. Chem. B*, 101:6661-6664 (1997).

Zhou et al., "A Novel Ultraviolet Irradiation Technique for Shape-Controlled Synthesis of Gold Nanoparticles at Room Temperature", *Chem. Mater.*, 11:2310-2312 (1999).

* cited by examiner

Fig. 3(a)
(0.30 mM NaBH₄)

Fig. 3(b)
(0.80 mM NaBH₄)

METHOD OF MAKING METAL NANOPRISMS HAVING A PREDETERMINED THICKNESS

CROSS REFERENCE TO PRIOR APPLICATIONS

This application is a U.S. National Phase of PCT/US2005/023038, which was filed Jun. 29, 2005, which in turn claims priority to U.S. Provisional Patent Application No. 60/584,775, which was filed Jun. 30, 2004, each of which is incorporated in its entirety by reference herein.

STATEMENT OF GOVERNMENTAL INTEREST

This invention was supported by National Science Foundation-NSEC Grant No EEC-0118025, Office of Naval Research Grant No. N00014-03-1-0800. The government may have an interest in this invention.

FIELD OF THE INVENTION

The present invention relates to nanoparticles, and more particularly to a facile manufacture of metal nanoprisms, such as silver nanoprisms, having a predetermined thickness.

BACKGROUND OF THE INVENTION

Metallic nanoparticles have generated significant scientific and technological interest because of their unusual optical properties, as well as their novel chemical and catalytic properties. Nonspherical nanoparticles, and in particular anisotropic particles, are of major interest because they allow investigation of how shape affects the physical and chemical properties of such structures. Accordingly, a variety of nanoparticle shapes, including stars, cubes, rods, discs, and prisms, have been prepared, and their properties have been preliminarily characterized.

In addition to nanoparticle shape, size is an important nanoparticle parameter because size allows control over several nanoparticle physical and chemical properties, including luminescence, conductivity, and catalytic activity. Over the past century, colloid chemists have gained excellent control over particle size for several spherical metal and semiconductor compositions. This chemical control over particle size led to the discovery of quantum confinement in colloidal nanocrystals and their exploitation as probes in biological diagnostic applications, LED materials, lasers, and Raman spectroscopy enhancing materials.

In contrast, the challenge of synthetically controlling particle shape has been met with limited success. Nevertheless, some physical and solid-state chemical deposition methods for making semiconductor and metal nanowires, nanobelts, and dots have been developed, and a variety of methods for preparing rods using electrochemical and membrane-templated syntheses with a moderate control over aspect ratios now exist.

Several methods of synthesizing silver and gold nanoparticles in a variety of shapes, including disks (Refs. 1-4), rods (Refs. 5-9), prisms (Refs. 10-14), wires (Refs. 15-18), hollow structures (Refs. 19-22), and branched particles (Ref. 23) have been disclosed. Recently, an intense effort has been directed to the synthesis of triangular silver nanoprisms (Refs. 13-17), in part, because of their unusual optical properties, but also because high yield photochemical methods have been developed for preparing relatively monodisperse nanoprisms with significant control over edge length (Refs. 10 and 25). These capabilities allow investigators to make important structure versus property correlations for such nanoparticles.

In general, two approaches are available for synthesizing silver nanoprisms, i.e., a thermal approach and a photochemical approach. Photochemical routes provide more monodisperse nanoprisms and a greater control over structural parameters through selective plasmon excitation of prism precursors and the resulting prisms (Refs. 10-12). Through a judicious selection of irradiation wavelengths, investigators can control the size, shape, and size distribution (i.e., unimodal or bimodal size distributions) of silver nanoprisms. Thermal routes to silver nanoprisms typically involve the gradual conversion of colloidal silver nanoparticles to silver nanoprisms (Refs. 12, 13). No current thermal method provides a rational control over silver nanoprism thickness or size distribution.

For example, methods of manufacturing nonspherical particles, such as triangles and cubes, exist, e.g., platinum cubes and pyramids (Ref. 26), and PbSe, CdS, and Ni triangles (Refs. 27-29). Additional research resulted in methods of synthesizing $BaCrO_4$, CdSe, and Co nanorods and distributions of arrow-, teardrop-, and tetrapod-shaped CdSe nanocrystals (Refs. 30-33). Each of these solution methods are based on thermal processes, and in most cases, with the exception of rods, yield relatively small quantities of the desired particle shape.

Synthetic methods that allow control over particle shape are expected to lead to important fundamental and technological advances in the art. This is analogous to particle size control in nanoscale materials which led to the discovery of new and important fundamental science and technological applications in diagnostics, optics, catalysis, and electronics. Therefore, the development of bulk solution synthetic methods that offer control over nanoparticle shape and size is of paramount importance in order to realize the full potential of these novel nanoscale materials.

Thus, there remains a need in the art for a simple method of preparing triangular metal nanoprisms of a predetermined thickness that also provides control over edge length.

SUMMARY OF THE INVENTION

The present invention is directed to a method of preparing metal nanoprisms, such as silver nanoprisms, of a predetermined thickness. More particularly, the present invention is directed to a simple, straightforward method of preparing triangular metal nanoprisms having a predetermined thickness, that also provides a degree of control over nanoparticle edge length.

Therefore, one aspect of the present invention is to provide a method of preparing metal nanoprisms having a unimodal size distribution in a one-step process.

Another aspect of the present invention is to provide a method of preparing metal nanoprisms, wherein metal nanoparticles are converted to metal nanoprisms in a thermal approach using hydrogen peroxide and sodium borohydride.

Yet another aspect of the present invention is to provide a one-step method of preparing metal nanoprisms comprising preparing an aqueous solution of a metal salt, a polycarboxylic acid salt, a dispersing agent, and hydrogen peroxide, then adding a mild reducing agent to the solution to form metal nanoprisms.

Another aspect of the present invention is to provide a method of manufacturing silver nanoprisms from a solution comprising a silver salt, a citrate salt, polyvinylpyrrolidine, and hydrogen peroxide, and using sodium borohydride as the mild reducing agent.

Still another aspect of the present invention is to provide a method of manufacturing metal nanoprisms, such as silver nanoprisms, wherein the dimensions of thickness and edge length, and especially thickness, can be controlled by varying the concentration of sodium borohydride and/or sodium peroxide used in the method.

Yet another aspect of the present invention is to provide a method of changing the morphology of metal nanoprisms provided in the present thermal process by irradiating the nanoprisms at one or more wavelength for a sufficient time to provide metal nanoparticles of the desired morphology.

These and other novel aspects of the invention will become apparent from the following detailed description of the preferred embodiments.

DETAILED DESCRIPTION OF THE PREFERRED EMBODIMENTS

The present invention provides a novel, thermal method of preparing large quantities of metal nanoprisms in high yield in the form of a colloidal suspension. Importantly, the present thermal method provides a nanoprism-containing colloid having a unique set of optical properties that directly relate to the shape control afforded by the present method.

The method of the present invention provides metal nanoprisms, particularly silver nanoprisms. More particularly, the present invention provides a new thermal route that yields metal nanoprisms having a unimodal size distribution, with a control over edge length. Importantly, the present method allows the preparation of metal nanoprisms having a predetermined thickness, which is a parameter that could not be controlled via prior photochemical and thermal methods of preparing metal nanoprisms.

Figure 1A:
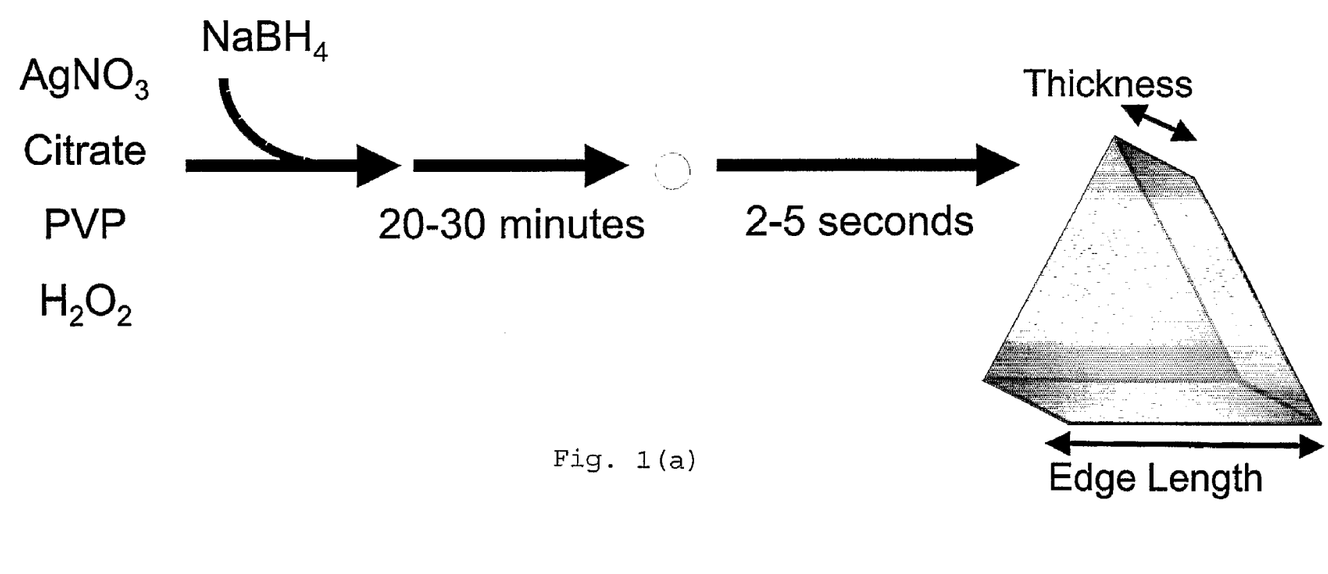
FIG. 1(a) is a schematic illustrating the preparation of silver nanoprisms in accordance with the present invention.

The method of the present invention provide metallic triangular nanoprisms, as illustrated by silver nanoprisms of FIG. 1(a). FIG. 1(a) also illustrates, and defines, the terms nanoprism "thickness" and "edge length," as used herein in connection with metal nanoprisms.

As discussed more fully herein, FIG. 1(a) illustrates the present method of metal nanoprism synthesis. The following detailed description is directed to the preparation of silver nanoprisms. However, it should be understood that this disclosure is for illustrative purposes only, and other metal nanoprisms of a predetermined thickness are envisioned as capable of being manufactured using the method of the present invention using an appropriate metal salt as a starting material.

In particular, FIG. 1(a) illustrates the present thermal process for converting silver nanoparticles to silver nanoprisms using an aqueous solution comprising silver nitrate ($AgNO_3$), a citrate salt, polyvinylpyrrolidone (PVP), and hydrogen peroxide ($H_2O_2$), and an addition of a sodium borohydride ($NaBH_4$) solution. As discussed more fully hereafter, the thickness of the resulting silver nanoprisms is directly related to the concentration of $NaBH_4$ added to the solution.

More generally, the present method of preparing metal nanoprisms comprises the steps of (a) forming an aqueous solution comprising a metal salt, a polycarboxylic acid salt, a dispersing agent, and hydrogen peroxide, then (b) adding a mild reducing agent to the solution of step (a) to form the metal nanoprisms.

The metal salt of the aqueous solution comprises the metal of the nanoprism as the cation. The anion of the salt is selected such that the metal salt is water soluble. The metal cation of the salt, therefore, can be silver. The anion of the salt can be nitrate, perchlorate, sulfate, acetate, or mixtures thereof, for example. The salt is selected such that the salt is sufficiently soluble in water to provide at least a 0.01 mM solution, preferably at least a 0.05 mM solution, and more preferably at least a 0.1 mM solution.

In some embodiments, when the metal cation of the salt is silver, the anion is nitrate or perchlorate. It also is envisioned that a mixture of metal salts can be used as long as an aqueous solution of the salts is compatible and does not form a precipitate. When a mixture of metal salts is used, the nanoprisms contain a mixture of metals.

The polycarboxylic salt of the aqueous solution has at least three carboxylic acid groups, and can be any polycarboxylic acid salt that is soluble in water, and that is compatible with the other solution ingredients. Nonlimiting examples of useful polycarboxylic acid salts include citrate salts, ethylenediaminetetraacetate (EDTA) salts, and related polyamines carboxylic acid salts, such as diethylenetriaminepentaacetic acid (DTPA), N-hydroxyethylethylenediaminetriaacetic acid (HEDTA), and nitrilotriacetic acid (NTA). A preferred polycarboxylic acid salt is a citrate salt, such as trisodium citrate or tripotassium citrate, for example.

The dispersing agent of the aqueous solution can be any material that prevents agglomeration or aggregation of metal nanoprisms prepared in the process. Nonlimiting examples of dispersants are polyvinylpyrrolidine, bis(p-sulfonatophenyl) phenylphosphine dipotassium dihydrate, sodium poly(acetate), and polyethyleneimine.

The mild reducing agent can be any agent capable of forming nanoprisms from the aqueous solution containing the metal salt, polycarboxylic acid salt, dispersing agent, and hydrogen peroxide. The reducing agent typically is an aluminum hydride or a boron hydride. Nonlimiting examples of mild reducing agents useful in the present invention include, but are not limited to, sodium borohydride, sodium triacetoxy borohydride, diisobutylaluminum hydride, lithium aluminum hydride, potassium tri-sec-butylborohydride, potassium triethylborohydride, sodium tri-sec-butylborohydride, lithium triethylborohydride, lithium tri-sec-butylborohydride, methyl oxazaborolidine, diisopinocampheylchloroborane, methoxydiethylborane, dibutylboron triflate, dicyclohexylboron triflate, dicyclohexylchloroborane, borane-tetrahydrofuran complex, dimethylsulfide borane, diethylaniline borane, tert-butylamine borane, morpholine borane, dimethylamine borane, triethylamine borane, and pyridine borane.

An aqueous solution useful in the present invention typically comprises:

(a) about 0.01 to about 0.1 mM, and preferably about 0.01 to about 0.05 mM, of a metal salt;

(b) about 0.001 to about 3 mM, and preferably about 0.1 to about 0.75 mM, of a polycarboxylic acid salt;

(c) about 0.01 to about 1 mM, and preferably about 0.04 to about 0.06 mM, of a dispersing agent; and (d) about 10 to about 100 mM, and preferably about 15 to about 40 mM, of hydrogen peroxide. The concentration of mild reducing agent added to the aqueous solution is about 0.3 to about 1 mM, wherein the concentration of mild reducing agent provides metal nanoprisms of a predetermined thickness.

The following is a nonlimiting example of the present invention.

EXAMPLE 1

Silver nitrate (99.998%, $AgNO_3$), trisodium citrate (99%), sodium borohydride (99%, $NaBH_4$), and polyvinylpyrrolidone ($M_w$ about 29,000 g/mol, PVP) were purchased from Sigma-Aldrich, St. Louis, Mo. Hydrogen peroxide (30 wt % solution in water, $H_2O_2$) was obtained from Fisher Chemicals, Inc. All chemicals were used as received. Water was purified using a Barnstead Nanopure water purification system (resistance=18.2 MΩ cm). All experiments were performed in air and at ambient temperature (25° C.).

In a typical preparation, 25 mL of water, 0.5 mL of $AgNO_3$ (5 mM), 1.5 mL of citrate (30 mM), and 1.5 mL of PVP (0.7 mM) were combined in a 50 mL pear-shaped flask and vigorously stirred at room temperature, in the presence of air. To this mixture, 60 μL of $H_2O_2$ (30 wt %) was injected, followed immediately by the rapid addition of 0.1 to 0.25 mL of $NaBH_4$ (100 mM, ice cold, freshly made). The colorless solution immediately turned pale yellow. Stirring was maintained for about 15 to about 30 minutes, until a rapid color change occurred indicating that nanoprisms had formed. After 30 minutes, the colloid darkened to a deep yellow color, indicating that the formation of small, silver nanoparticles, as demonstrated by UV-vis spectroscopy and the identification of the nanoparticle surface plasmon resonance at 395 nm. Over the next several seconds, the colloid color rapidly changed from yellow to red. The nanoprism colloid was allowed to stir for five minutes after the color change had taken place. Nanoprism solutions were transferred to glass vials and stored in the dark.

In contrast to previous investigations directed to the preparation of silver nanoprisms (Ref. 10), the preparatory reaction described herein occurs in the dark and, therefore, is a thermal process. The resulting nanoprism colloids, when stored in the dark at room temperature, were stable for months, as demonstrated by a lack of change in their UV-vis spectra.

It has been found that the concentration of mild reducing agent utilized in the present method has a substantial effect on the degree of conversion of silver nanoparticles to nanoprisms. The in-plane dipole surface plasmon band is known to be a good indicator of general nanoprism architecture (Refs. 10, 24). Therefore, it is relatively easy to assess the effect of various reaction parameters on the type of nanoprisms formed by evaluating the UV-vis spectra of the colloids. When four $NaBH_4$ concentrations over the 0.30 to 0.80 mM range that were tested, four different nanoprisms were obtained.

Figure 1B:
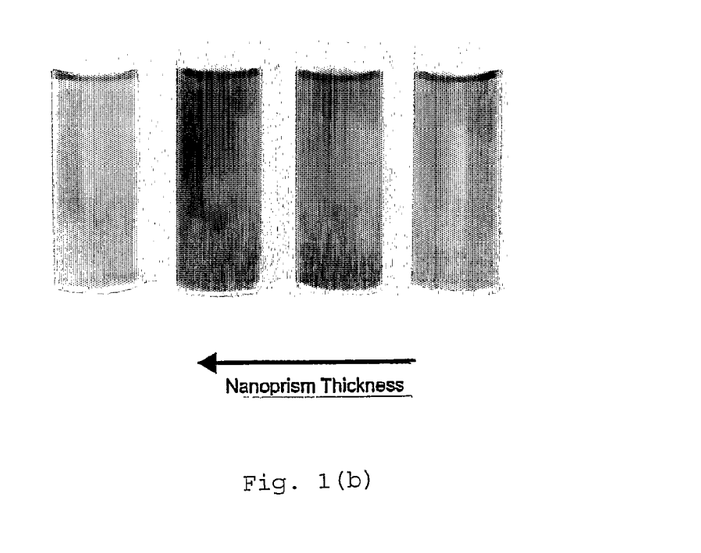
FIG. 1(b) contains illustrations of silver (Ag) nanoprisms prepared using different concentrations of sodium borohydride ($NaBH_4$)

By varying the concentration of $NaBH_4$ added to the solution, the final color of the colloidal solution ranged from pink/purple (for 0.30 mM $NaBH_4$) to turquoise (for 0.8 mM $NaBH_4$). See FIG. 1(b) illustrating solutions of silver nanoprisms containing different concentrations of $NaBH_4$, i.e., 0.30 mM, 0.50 mM, 0.67 mM, and 0.80 mM, from left to right. The thickness of the silver nanoprisms in these four solutions is 7±1.5 nm (0.30 mM $NaBH_4$), 6.9±1.2 nm (0.50 mM $NaBH_4$), 5.5±0.6 nm (0.67 mM $NaBH_4$), and 4.3±1.1 nm (0.80 mM $NaBH_4$), showing that a predetermined metal nanoprism thickness can be achieved by a proper selection of the concentration of mild reducing agent.

Figure 2A:
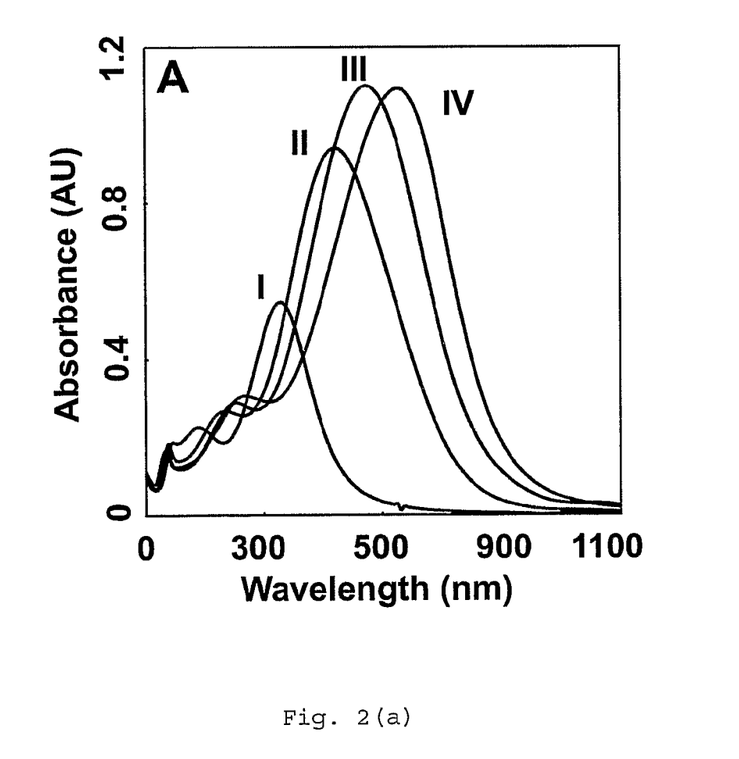
FIG. 2(a) contains UV-visible spectra of Ag nanoprism colloids containing various concentrations of $NaBH_4$.
Figure 2B:
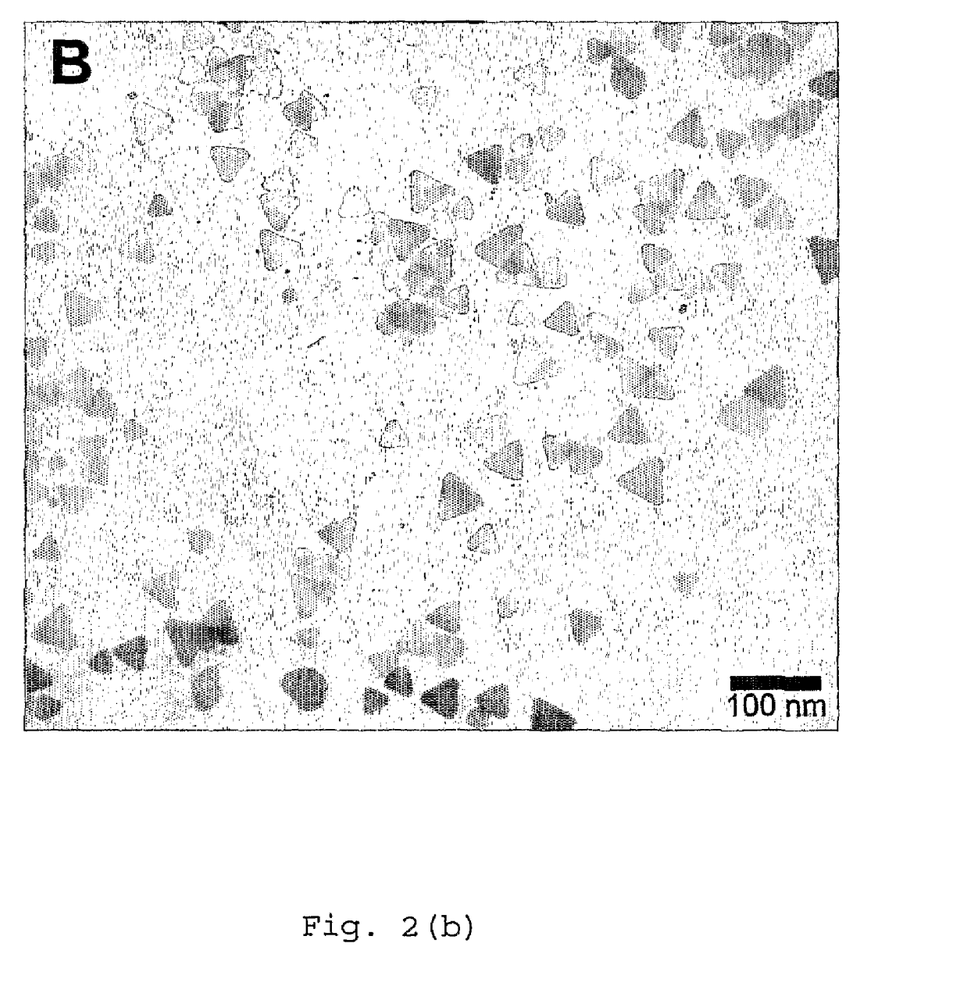
FIG. 2(b) contains a transmission electron microscope (TEM) image of Ag nanoprisms.

FIG. 2(a) contains UV-vis (ultraviolet-visible) spectra of nanoprism colloids prepared from a $NaBH_4$ concentration varying from 0.30 to 0.80 mM at a constant 0.20 mM $H_2O_2$ concentration. In FIG. 2(a), I-IV corresponds to 0.30, 0.50, 0.67, and 0.80 mM $NaBH_4$, respectively. In general, in FIG. 2(a), a greater red shifting was observed as a function of increasing $NaBH_4$ concentration. Red shifts in the in-plane dipole surface plasmon band have been correlated with increasing edge length and tip sharpness of the silver nanoprisms (Refs. 10, 24). TEM analysis (e.g., FIG. 2(b) nanoprisms made using 0.8 mM $NaBH_4$ and 20 mM $H_2O_2$) shows only modest increases in nanoprism edge length formed for the four $NaBH_4$ concentrations studied (i.e., 31±7 nm for 0.3 mM $NaBH_4$, 32±8 nm for 0.5 mM $NaBH_4$, 35±8 nm for 0.67 mM $NaBH_4$, and 39±8 nm for 0.8 mM $NaBH_4$). Based upon previous work with photochemically generated nanoprisms (Ref. 10), a 60 nm shift in the plasmon band wavelength for particles with comparable tip morphology and thickness is expected, as opposed to the 200 nm shift observed in these experiments. Accordingly, the magnitude of the red shift cannot be explained only by differences in edge length. Thus, a parameter other than edge length changed in the nanoprisms as a function of synthetic conditions.

Figure 3A:
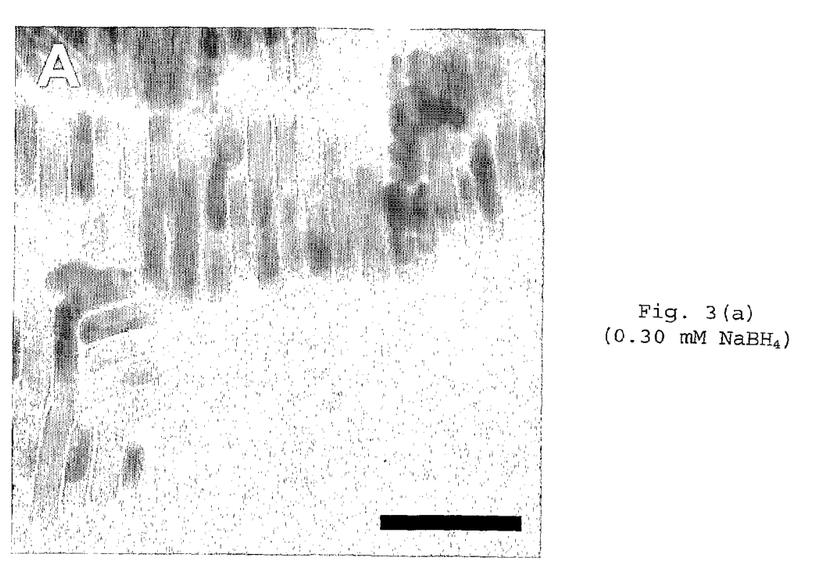
FIG. 3 contains TEM images showing the effect of $NaBH_4$ concentration on nanoprism thickness.
Figure 3B:
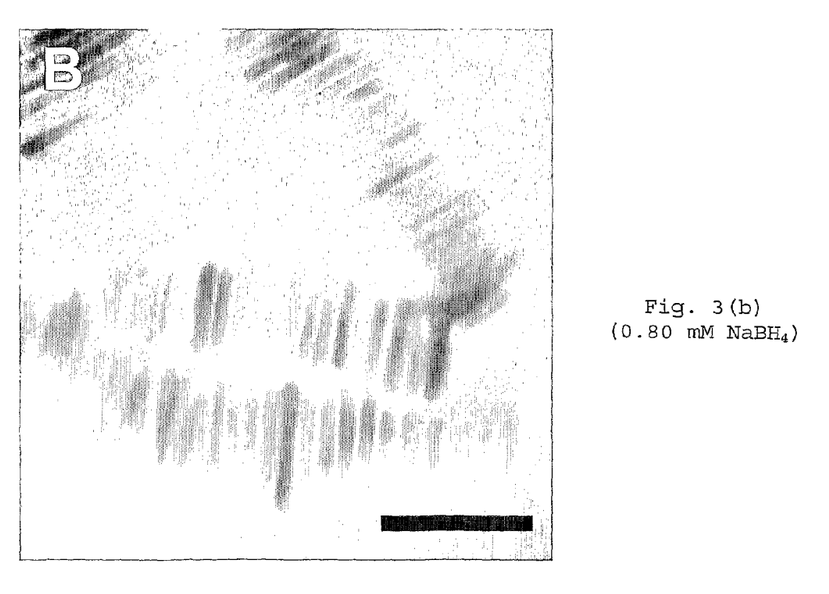

A detailed analysis of TEM data for the colloids reveals two factors that account for this discrepancy. First, the tips of the nanoprisms become slightly sharper as the concentration of sodium borohydride increases from 0.3 mM to 0.8 mM. This accounts for a 27-55 nm red shift based upon discrete dipole approximation calculations (Ref. 25). A second observation is that the silver nanoprisms become thinner as $NaBH_4$ concentration increases. TEM data reveals that the average nanoprisms thickness decreases from 7.0±1.5 nm for colloids prepared using 0.3 mM $NaBH_4$ (FIG. 3). In particular, FIG. 3 contains TEM images of silver nanoprism stacks illustrating the effect of $NaBH_4$ concentration on nanoprism thickness. In FIG. 3(a), $NaBH_4$ concentration is 0.30 mM, and in FIG. 3(b), the $NaBH_4$ concentration is 0.80 mM (scale bar is 50 nm). Discrete dipole approximation (DDA) calculations show that increased particle thickness, in combination with the modest increase in edge length, account for the observed large differences in the UV-vis spectra of the nanoprism colloids.

Figure 4:
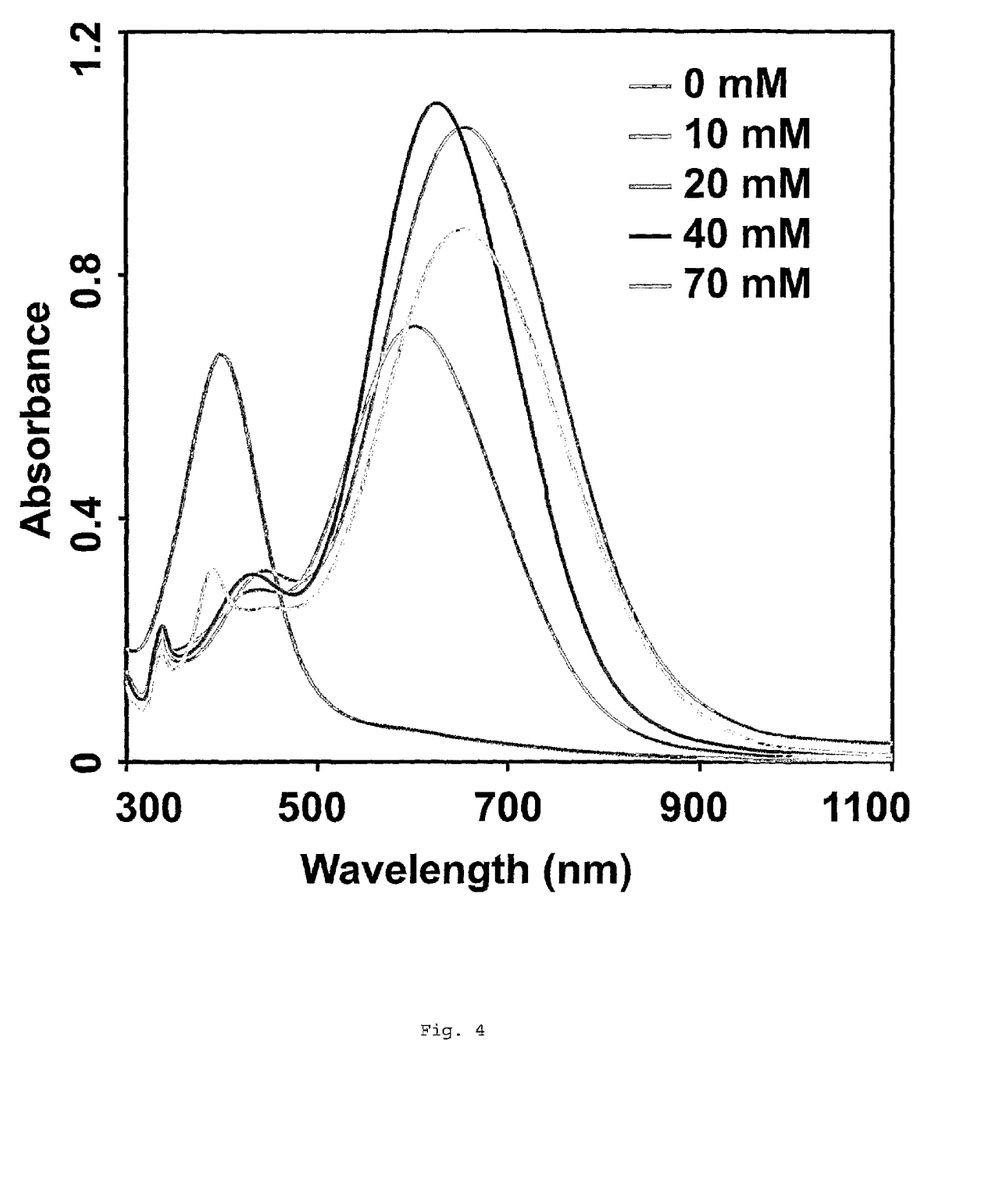
FIG. 4 contains UV-vis spectra demonstrating the effect of hydrogen peroxide concentration on the preparation of nanoprism colloids.

The effect of hydrogen peroxide concentration on the reaction also was studied. The results are summarized in FIG. 4. In these experiments, PVP was maintained at a constant 0.04 mM, $NaBH_4$ was maintained at a constant 0.50 mM, and citrate was maintained at a constant 1.8 mM. Samples prepared in the absence of $H_2O_2$ exhibit a single peak in the UV-vis spectrum at 395 nm, typical of the starting spherical 6 to 8 nm Ag nanoparticles. Although nanoprisms form at low $H_2O_2$ concentrations (about 10 mM), as evidenced by two peaks at 525 nm and 430 nm, the UV-vis spectra of these samples also display a shoulder at 395 nm, indicating the presence of residual spherical Ag nanostructures.

Similarly, prism syntheses performed using an $H_2O_2$ concentration in excess of 70 mM resulted in mixtures of prisms and spheres. Such samples displayed two diagnostic strong absorption bands in their UV-vis spectra at 700 nm (nanoprisms) and 395 nm (nanoparticles). Interestingly, UV-vis data indicate that nanoprism morphology is relatively insensitive to $H_2O_2$ concentrations between about 15 and about 40 mM.

Studies directed to the effect of PVP and citrate concentrations on the present method of manufacturing metal nanoprisms also were conducted. Varying PVP concentration over a range of 0.02 to 0.1 mM, with a fixed citrate concentration (1.8 mM), resulted in stable nanoprism colloids. In the absence of PVP, ill-defined particle aggregates formed, which indicates that PVP assists in the formation of a stable colloid. The stabilization is theorized, but not relied upon, to result from surface passivation. Nanoprisms of comparable shape and size also can be obtained when bis(p-sulfonatophenyl) phenyl phosphine dipotassium dihydrate (BSPP, 0.05 mM) is substituted for PVP as the dispersing agent. This study indicates that the dispersing agent does not have a shape-directing role in the present method, but rather prevents the formed metal nanoprisms from aggregating.

In contrast, citrate is critical in the formation of metal nanoprisms by the present method. When citrate is omitted from the reaction mixture and PVP concentration is fixed at 0.4 mM, silver nanoparticles are the sole observed product, even after prolonged stirring (see FIG. 5(a)). Nanoprism preparation performed at a low citrate concentration (<0.1 mM citrate:$Ag^+$<1) yields triangular and hexagonal nanostructures having a broad range of sizes (30-300 nm edge length) (see FIG. 5(a)). When the concentration of citrate is greater than 0.1 mM (corresponding to citrate:$Ag^+$>1), nanoprisms are the major product, as illustrated by the collapse of the surface plasmon absorption band at 395 nm and the emergence of the diagnostic prism plasmon bands at 335, 380-460, and 520-725 nm. It is theorized, but not relied upon, that citrate effects face selective growth by adsorbing more strongly to the Ag (111) surface in order to direct the final triangular shape.

Figure 5A:
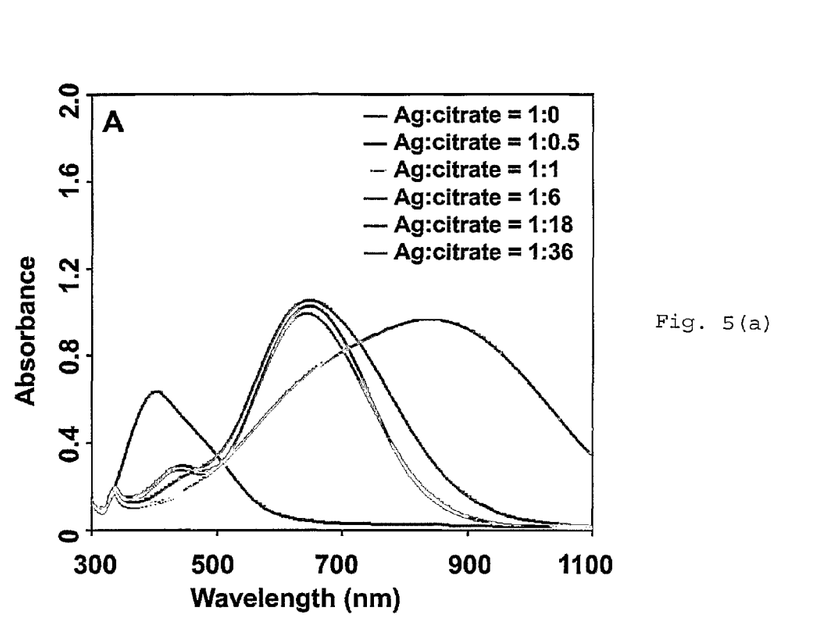
FIG. 5(a) contains UV-visible spectra for Ag nanoprisms containing different ratios of silver ions to citrate ions.
Figure 5B:
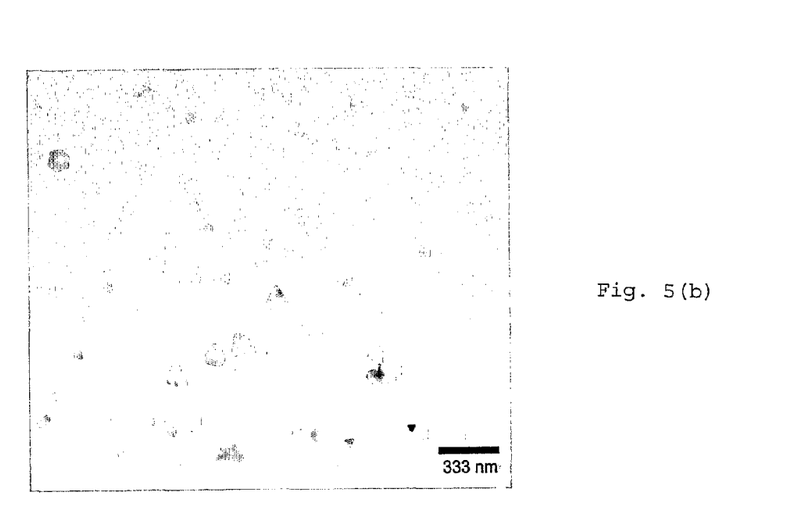
FIG. 5(b) contains a TEM image of a nanoprism colloid prepared from a solution having a ratio of Ag ions to citrate ions of 1:0.5.

In particular, FIG. 5(a) contains UV-vis spectra of silver nanoprism colloids prepared from solutions having various citrate concentrations and constant concentrations of PVP (0.04 mM), $NaBH_4$ (0.50 mM), and $H_2O_2$ (20 mM). Silver nanoprisms were not obtained when citrate was omitted from the method (Ag:citrate ratio of 1:0). Colloids having a low initial citrate concentration (Ag:citrate of 1:0.5 and 1:1) provide a broad size and shape distribution of the silver nanostructures in the colloid (i.e., a strong absorbance at about 850-900 nm). FIG. 5(b) is a TEM image of a colloid formed from a solution having an Ag:citrate ratio of 1:0.5.

Nanoprisms prepared by the method of the present invention have an edge length of less than about 50 nm and preferably less than about 40 nm. Most preferably, the nanoprisms have an edge length about 30 nm to about 39 nm. The nanoprisms have a thickness of less than about 10 nm, and often less than about 5 nm, e.g., about 3 nm. Typically, the nanoprisms have a thickness of between about 3 nm and about 8.5 nm. In accordance with the present invention, nanoprisms of a predetermined thickness can be prepared by a judicious selection of the amount of mild reducing agent, e.g., $NaBH_4$, utilized in the method.

The present invention provides a straight-forward and rapid route to metal nanoprisms, and particularly silver nanoprisms, with an ability to provide metal nanoprisms of predetermined nanoprism thickness, which is an architectural parameter not accessible by any presently known synthetic method for such nanostructures.

Figure 6A:
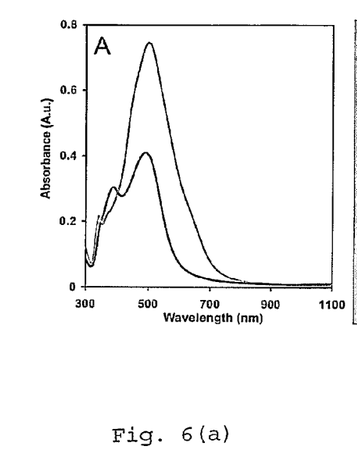
FIGS. 6-8 contain UV-visible spectra and TEM images of silver nanoprisms prepared by the present method, followed by exposure to light.
Figure 6B:
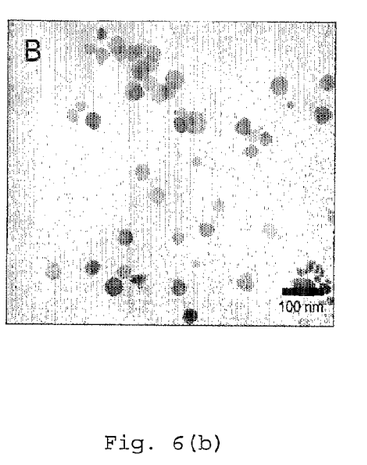

An additional feature of the present invention is the discovery that edge-selective fusion of the thermally prepared metal nanoprisms can be induced via excitation of the colloid by irradiation using an appropriate wavelength of light. In particular, it was observed that the optical properties of a colloid of silver nanoprisms prepared by the present thermal method changed dramatically when the colloid was exposed to ambient fluorescent light (FIG. 6(a)). The final morphology of the nanostructures resembled that of a disk rather than a prism, which indicates prism tip degradation (FIG. 6(b)). FIG. 6(a) contains UV-vis spectra of silver nanoprisms prepared by the present thermal method using an $NaBH_4$ concentration of 0.3 mM before (dark) and after (light) exposure to fluorescent light for one day. FIG. 6(b) is a TEM image of silver nanoprisms after irradiation for one week in fluorescent light. The tips of the silver nanoprisms were truncated, which result in a disk-like shape.

From prior work with silver nanoprisms and light, it is known that exposure of a colloid to a single wavelength (e.g., 500 nm) results in nanoprisms having a bimodal size distribution comprised of prisms having an edge length of 70 nm (Type I nanoprisms) and 150 nm (Type II). In contrast, subjecting the colloid to two wavelengths, such as 550 nm and 340 nm, the latter of which being equivalent to the quadrupole resonance of the nanoprisms, produces a colloid having a unimodal size distribution (average prism edge length 70 nm). It was determined that exciting the colloid with the quadrupole resonance wavelength effectively shuts down fusion of the Type I nanoprisms that results in the formation of the larger Type II structures.

The thermally prepared silver nanoprisms of the present invention were subjected to light to determine whether light affects nanoprism fusion. In initial experiments, silver nanoprisms of a specific size and thickness were prepared via the present thermal route and subsequently exposed to specific wavelengths of light. In a typical experiment, silver nanoprisms having a 31 nm±7 nm average edge length and a 7.0 nm±1.5 nm thickness (prepared from 0.3 mM $NaBH_4$) were prepared via the thermal route. The red colloid was subsequently placed in a glass vial fitted with an optical filter having the desired wavelength passband (600±20 nm, Intor Optical Filters, Inc.) and exposed to a Xe arc lamp (150 W).

Figure 7A:
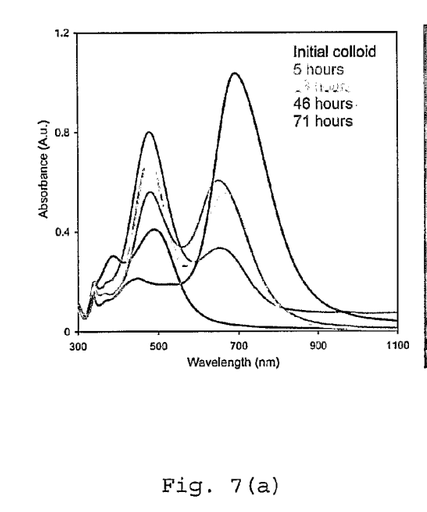
Figure 7B:
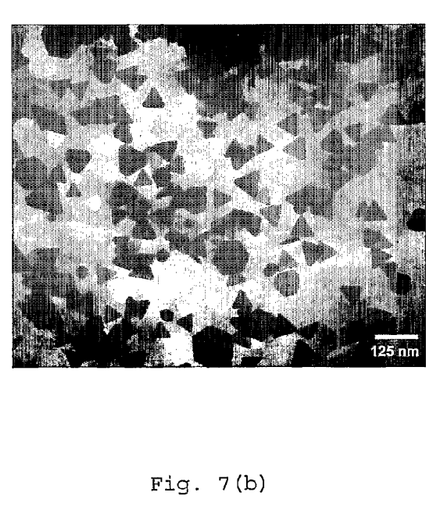

FIG. 7 illustrates the UV-vis spectra of a nanoprism colloid during exposure to 600 nm±20 nm light for approximately three days. The in-plane dipole resonance of the initial nanoprisms at about 520 nm collapses with the concomitant growth of a new band at about 700 nm. The final spectrum resembles that of silver nanoprisms. TEM analysis confirmed the presence of silver nanoprisms with edge lengths of approximately 90 nm. In particular, FIG. 7(a) contains UV-vis spectra of a colloid containing about 30 nm nanoprisms exposed to 600 nm±20 nm light for about three days. FIG. 7(b) is a TEM image of silver nanoprisms after 71 hours of exposure to 600 nm±20 nm light.

The UV-vis spectra suggest that the large nanoprisms are growing via fusion of smaller ones. If the nanoprisms were growing via Ostwald ripening, one would expect a gradual red shift of the in-plane dipole resonance as the average edge length of the nanoprisms increases. In contrast, the in-plane dipole of the larger nanoprisms appears as that of the small prisms disappears. This is reminiscent of the silver nanoprisms grown photochemically using single wavelength excitation.

Figure 8A:
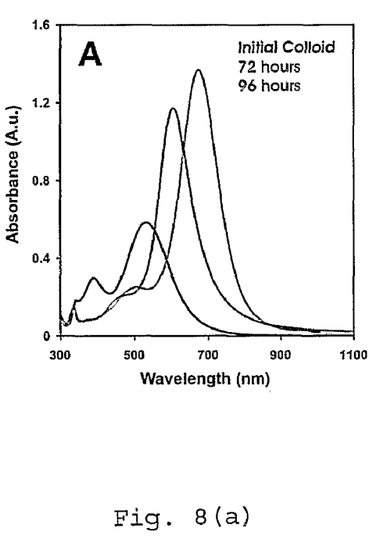
Figure 8B:
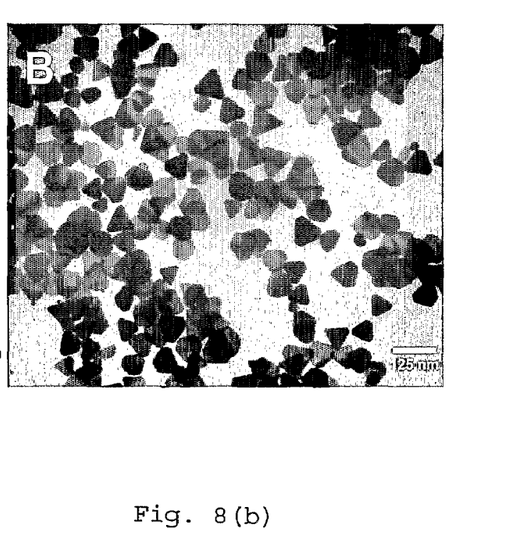

Experiments also show that the time of irradiation is important. FIG. 8 illustrates how excitation for extended periods of time results in etching of the nanoprism tips as evidenced by a blue shift in the in-plane dipole resonance of the nanoprisms. FIG. 8(a) contains UV-vis spectra of silver nanoprisms exposed to 600 nm±20 nm light for various periods of time. A definite blue shift of the dipole resonance is observed between 71 and 96 hours of excitation. FIG. 8(b) is a TEM image of silver nanoprisms after 96 hours of excitation with 600 nm±20 nm of light. The prism tips have been truncated and the overall average edge length has decreased.

REFERENCES (1) E. C. Hao et al., *J. Am. Chem. Soc.*, 124:15182-83, 2002.

(2) S. Chen et al., *J. Phys. Chem. B*, 106:10777-81, 2002.

(3) (a) M. Maillard et al., *Adv. Mater.*, 14:1084-86, 2002; (b) M. Maillard et al., *Nano Lett.*, 3:1611-15, 2003.

(4) X. G. Sun et al., *Analyst*, 128:686-91, 2003.

(5) F. Kim et al., *J. Am. Chem. Soc.*, 124:14316-17, 2002.

(6) Y.-Y Yu et al., *J. Phys. Chem. B*, 101:6661-4, 1997.

(7) K. Esumi et al., *Langmuir*, 11:3285-87, 1995.

(8) Y. Tan et al., *J. Coll. Int. Sci.*, 258:244-51, 2003.

(9) (a) J. Gao et al., *Langmuir*, 19:9065-70, 2003; (b) N. R. Jana et al., *J. Phys. Chem. B*, 105:4065-67, 2001.

(10) (a) R. Jin et al., *Science*, 294:1901, 2001; (b) R. Jin et al., *Nature*, 425:487-90, 2003.

(11) A. Callegari et al., *Nano Lett.*, 3:1565-68, 2003.

(12) (a) Y. Sun et al., *Nano Lett.*, 3:675-79, 2003; (b) Y. Sun et al., *Adv. Mater.*, 15:695-9, 2003.

(13) (a) S. Chen et al., *Nano Lett.*, 2:1003-7, 2002; (b) S. Chen et al., *J. Phys. Chem. B*, 2004 ASAP article.

(14) Y. Zhou et al., *Chem. Mater.*, 11:2310-12, 1999.

(15) E. C. Walter et al., *J. Phys. Chem. B*, 106:11407-11, 2002.

(16) K. K. Caswell et al., *Nano Lett.*, 3:667-9 2003.

(17) (a) Y. Sun et al., *Nano Lett.*, 3:955-60, 2003; (b) Y. Sun et al., *Nano Lett.*, 2:165-8, 2002.

(18) M. Tian et al., *Nano Lett.*, 3:919-23, 2003.

(19) G. S. Metraux et al., *Nano Lett.*, 3:519-22, 2003.

(20) Y. Sun et al., *Adv. Mater.*, 15:641-6, 2003.

(21) (a) S. J. Oldenburg et al., *J. Appl. Phys. Lett.*, 75:2897-99, 1999; (b) J. B. Jackson et al., *J. Phys. Chem. B*, 105:2743-46, 2001.

(22) Y. Jin et al., *J. Phys. Chem. B*, 107:12902-05, 2003.

(23) E. Hao et al., *Nano Lett.*, 4:327-30, 2003.

(24) K. L. Kelly et al., *J. Phys. Chem. B*, 107:668-77, 2003.

(25) U.S. Patent Publication No. 2003/0136223.

(26) Ahmandi et al., *Science*, 272:1924, 1996.

(27) Fendler et al., *J. Am. Chem. Soc.*, 122:4631, 2000.

(28) Pinna et al., *Ad. Mater.*, 13:261, 2001.

(29) Klasu et al., *Proc. Natl. Acad. Sci. U.S.A.*, 96:13611, 1999.

(30) Li et al., *Nature*, 402:393, 1999.

(31) Peng et al., *Nature*, 404:59, 2000.

(32) Puntes et al., *Science*, 291:2115, 2001.

(33) Manna et al., *J. Am. Chem. Soc.*, 122:12700, 2000).

The foregoing description of the present invention has been presented for purposes of illustration and description. The description is not intended to limit the invention to the embodiment disclosed herein. Variations and modifications commensurate with the above teachings, and the skill or knowledge of the relevant art, are within the scope of the present invention.

What is claimed is:

1. A method of manufacturing metal nanoprisms comprising
   (a) forming an aqueous solution comprising (i) a metal salt, (ii) a polycarboxylic acid salt having at least three carboxylic acid groups, (iii) a dispersing agent, and (iv) hydrogen peroxide; and
   (b) adding a reducing agent to the solution of step (a) to form metal nanoprisms of a predetermined thickness.

2. The method of claim 1 further comprising a step of irradiating the metal nanoprisms of step (b) with light to increase the edge length of the metal nanoprisms.

3. The method of claim 1 wherein the metal salt is a silver salt.

4. The method of claim 3 wherein the anion of the silver salt is selected from the group consisting of nitrate, perchlorate, sulfate, acetate, and mixtures thereof.

5. The method of claim 1 wherein the metal salt is present in the aqueous solution in a concentration of about 0.01 to about 0.1 mM.

6. The method of claim 1 wherein the polycarboxylic acid salt is present in the aqueous solution in a concentration of about 0.001 to about 3 mM.

7. The method of claim 1 wherein the polycarboxylic acid salt is selected from the group consisting of a citrate salt, an ethylenediaminetetraacetate salt, a diethylenetriaminepentaacetic acid salt, an N-hydroxyethyl-ethylenediaminetriacetic acid salt, and a nitrilotriacetic acid salt.

8. The method of claim 1 wherein the polycarboxylic acid salt comprises a citrate salt.

9. The method of claim 1 wherein a ratio of metal salt concentration to citrate salt concentration is about 1:1 to about 1:36.

10. The method of claim 1 wherein the dispersant is selected from the group consisting of polyvinylpyrrolidone, bis(p-sulfonatophenyl)phenylphosphine dipotassium dihydrate, sodium poly(acetate), poly(ethyleneimine), and mixtures thereof.

11. The method of claim 1 wherein the dispersant is present in the aqueous solution in a concentration of about 0.01 to about 1 mM.

12. The method of claim 1 wherein the hydrogen peroxide is present in the aqueous solution in a concentration of about 10 to about 100 mM.

13. The method of claim 1 wherein the reducing agent is selected from the group consisting of sodium borohydride, sodium triacetoxy borohydride, diisobutylaluminum hydride, lithium aluminum hydride, potassium tri-sec-butylborohydride, potassium triethylborohydride, sodium tri-sec-butylborohydride, lithium triethylborohydride, lithium tri-sec-butylborohydride, methyl oxazaborolidine, diisopinocampheylchloroborane, methoxydiethylborane, dibutylboron triflate, dicyclohexylboron triflate, dicyclohexylchloroborane, borane-tetrahydrofuran complex, dimethylsulfide borane, diethylaniline borane, tert-butylamine borane, morpholine borane, dimethylamine borane, triethylamine borane, and pyridine borane.

14. The method of claim 1 wherein the reducing agent comprises sodium borohydride.

15. The method of claim 1 wherein the reducing agent is added to the aqueous solution in a concentration of about 0.3 to about 1 mM.

16. The method of claim 1 wherein the metal nanoprisms have a unimodal size distribution.

17. The method of claim 1 wherein the metal nanoprisms have an edge length of about 30 to about 40 nm.

18. The method of claim 1 wherein the metal nanoprisms have a thickness of about 3 to about 10 nm, wherein the thickness is predetermined and the predetermined thickness is achieved by a pre-selected concentration of hydrogen peroxide, by an addition of a pre-selected concentration of reducing agent, or both.

19. The method of claim 1 wherein the aqueous solution comprises
   (a) about 0.01 to about 0.05 mM of a metal salt;
   (b) about 0.1 to about 0.75 mM of a citrate salt;
   (c) about 0.04 to about 0.06 mM of a dispersant; and
   (d) about 15 to about 40 mM of hydrogen peroxide.

20. The method of claim 1 wherein the metal salt comprises a silver salt, the citrate salt comprises trisodium citrate, and the dispersing agent comprises polyvinylpyrrolidone.

21. The method of claim 18 wherein the reducing agent comprises sodium borohydride.

22. The method of claim 1 wherein the metal nanoprisms comprise silver nanoprisms.

23. The method of claim 2 wherein the metal nanoprisms are irradiated with light having a wavelength of about 580 to about 620 nm for about 24 to about 96 hours.

* * * * *